UNITED STATES PATENT OFFICE.

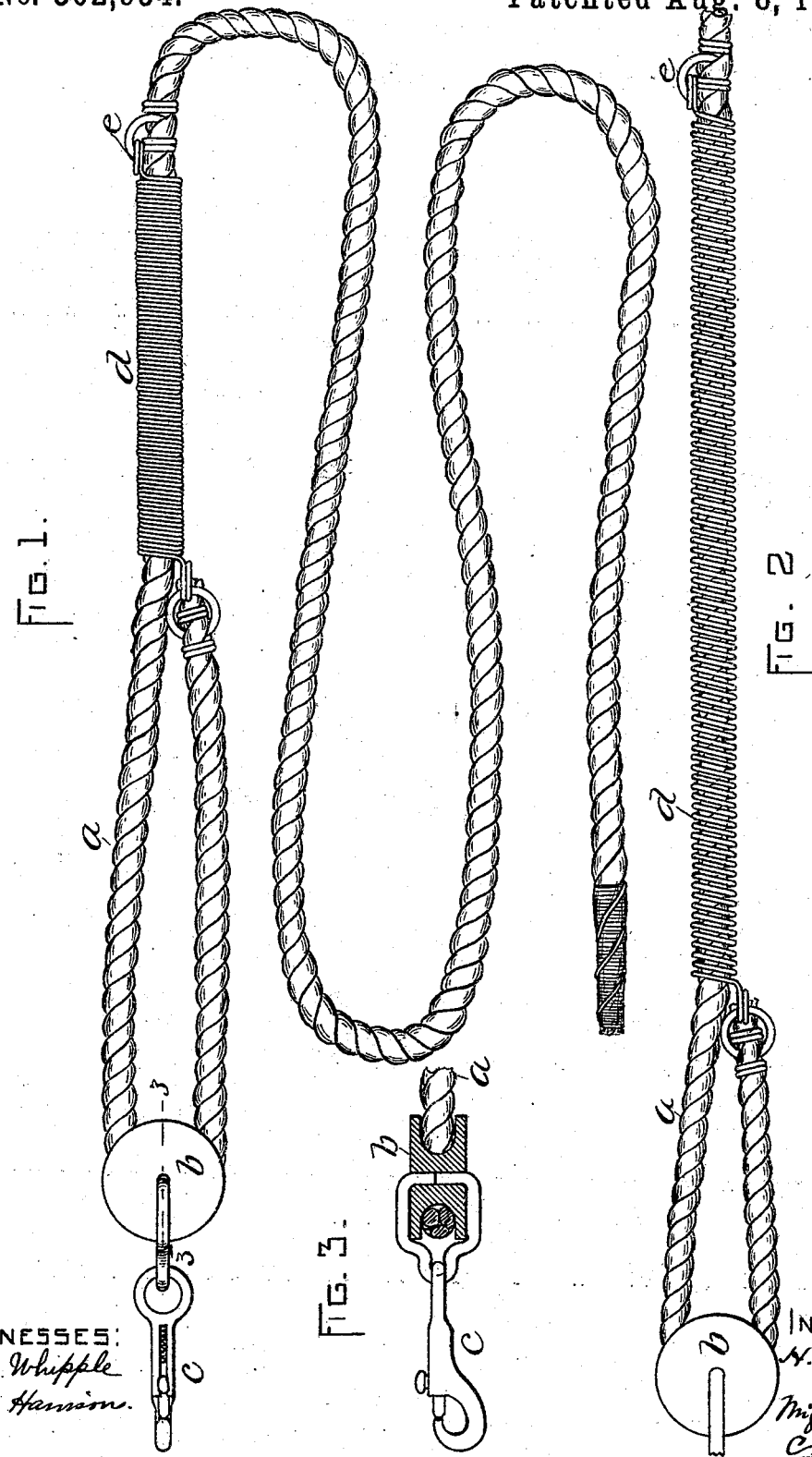

HENRY T. CREPEAU, OF PORTLAND, MAINE.

TETHER OR HALTER-STRAP.

SPECIFICATION forming part of Letters Patent No. 502,954, dated August 8, 1893.

Application filed March 18, 1893. Serial No. 466,565. (No model.)

*To all whom it may concern:*

Be it known that I, HENRY T. CREPEAU, of Portland, in the county of Cumberland and State of Maine, have invented certain new and useful Improvements in Tethers or Halter-Straps, of which the following is a specification.

This invention has relation to tethers generally; and it has for its object the provision of means for taking up a part of the slack of the tether and which will afford a yielding fastening, so that the animal to which the tether is attached may not, in tossing its head, be harmfully jerked by the sudden "bringing up" of the strap, and so, also, that the liability of breaking the strap may be lessened through the same cause.

To this end the invention consists of a halter strap or tether having one end passed about a pulley with which the snap hook or other fastening device is connected. Said end being doubled upon the main portion and attached to one end of a spring, surrounds and the other end of which spring is connected with the main portion, so that as the strap is drawn upon or put under tension, the doubled end will be paid out around the pulley, and when tension on the strap ceases the spring will take up the rope to the extent that it was drawn out.

Reference is to be had to the annexed drawings and to the letters marked thereon forming a part of this specification, the same letters designating the same parts or features as the case may be, wherever they occur.

Figure 1 is a view of a tether equipped with my improvements, showing the parts in their normal positions. Fig. 2 is a view similar to Fig. 1, showing the improvements as they will appear when the tether is put under tension or strain. Fig. 3 is a sectional view taken on the line 3, 3 of Fig. 1.

In the drawings—$a$ designates a tether, which, in the present case is shown as consisting of a rope though it might as well be a strap, preferably rounded, one end of which is passed around a pulley $b$ to which a snap-hook $c$ or other attaching device may be secured. The end or portion of the tether passed about the pulley is doubled on the main portion, and the extreme end is connected with one end of a helical spring $d$ which surrounds the main portion of the tether and is attached thereto at its opposite end, as at $e$. With this construction and arrangement of parts, should the tether be put under tension between the snap-hook $c$ and part beyond the spring $d$, the doubled over portion will be paid out around the pulley by the yielding of the spring, as shown in Fig. 2, and where there is a "let up" on the tension or strain on the tether the slack or amount of tether paid out will be taken up by the spring.

It will be noted that by the invention liability of jerking by the sudden "bringing up" of the strap or tether is avoided, so that the danger of breaking the tether or injuring the tethered animal is greatly lessened if not wholly overcome.

The pulley connected with the snap-hook provides for the ready movement of the tether, and avoids liability of the same catching or snarling.

Having thus explained the nature of the invention and described a way of constructing and using the same, though without attempting to set forth all of the forms in which it may be made or all of the modes of its use, it is declared that what is claimed is—

A tether or halter-strap comprising in its construction an attaching device, a pulley connected therewith, a doubled portion of the tether passed about the pulley, and a helical spring surrounding the single portion of the tether and at one end connected thereto, and attached at its other end to the doubled over end thereof, as set forth.

In testimony whereof I have signed my name to this specification, in the presence of two subscribing witnesses, this 13th day of March, A. D. 1893.

HENRY T. CREPEAU.

Witnesses:
ARTHUR W. CROSSLEY,
A. D. HARRISON.